United States Patent [19]

Larson et al.

[11] 4,112,365
[45] Sep. 5, 1978

[54] POSITION DETECTING SYSTEM

[75] Inventors: Gerald L. Larson, Battle Creek; Walter K. O'Neil, Southfield, both of Mich.

[73] Assignee: Eaton Corporation, Cleveland, Ohio

[21] Appl. No.: 768,928

[22] Filed: Feb. 15, 1977

[51] Int. Cl.² .......................................... G01R 15/12
[52] U.S. Cl. ............................... 324/173; 324/83 R; 324/207; 324/83 D
[58] Field of Search ................. 324/173, 83 D, 83 A, 324/34 PS, 34 D, 83 R

[56] References Cited

U.S. PATENT DOCUMENTS

| | | | |
|---|---|---|---|
| 3,543,150 | 11/1970 | Brandenburg | 324/83 D |
| 3,611,813 | 10/1971 | Brocker | 324/173 X |
| 3,683,345 | 8/1972 | Faulkes et al. | 324/83 D X |
| 3,997,835 | 12/1976 | Ando et al. | 324/34 PS |

*Primary Examiner*—Rudolph V. Rolinec
*Assistant Examiner*—Vincent J. Sunderdick
*Attorney, Agent, or Firm*—R. A. Johnston

[57] ABSTRACT

The position or presence of a metallic object is detected by an electronic circuit which senses a shift in phase between a first cyclic signal and a second cyclic signal which shifts in phase in response to movement of the object. An oscillator produces the first cyclic signal which is used as the reference signal and as the excitation for a parallel resonant circuit which produces the second signal. The phase of the second signal is shifted in response to movement of a metal plate or a shorted coil in an electromagnetic field produced by an inductor in the resonant circuit. The degree of the phase shifts may be used to detect the position of an object in the electromagnetic field or rate of the phase shifts may be used to detect the velocity of an object. An exclusive-or gate senses the changes or differences in phase between the two cyclic signals and produces an output signal representative of the changes or differences in phase. The output signal of the detector may be used with a digital counter to produce a digital output or with a smoothing filter to provide an analog output.

32 Claims, 5 Drawing Figures

POSITION DETECTING SYSTEM

BACKGROUND OF THE INVENTION

1. Field of the Invention

The invention relates to an electronic circuit for detecting the position, presence or velocity of an object and more specifically to such a circuit employing a phase shift of one of two signals in response to movement of the object.

2. Description of the Prior Art

The invention system has many uses, one of which is a throttle position detector. Many throttle position systems have been devised. One prior art system employs a rheostat; however, this system is subject to wear, since a wiper must be moved over a resistive material, and is subject to erroneous signals due to power supply voltage changes and resistance changes at the contact of the wiper. Another prior art system, which is contactless, employs the concept of moving one plate of a capacitor relative to the other and senses the change in magnitude of a cyclic signal in a circuit incorporating the capacitor; however, this system is vulnerable to spurious signals, power supply voltage changes, and to temperature changes. The system also finds use as an accurate and inexpensive velocity or speed detector.

SUMMARY OF THE INVENTION

An object of this invention is to provide a contactless position detection system which is insensitive to spurious signals, power supply voltage changes, and temperature changes. Another object of this invention is to provide an accurate and inexpensive speed detector.

The objects are realized by an electronic circuit including a detector which senses the difference in phase between a first cyclic signal and a second cyclic signal produced by a resonant circuit which shifts the phase of the second cyclic signal in response to movement of a coupling or object which changes the impedance of the resonant circuit by induction.

BRIEF DESCRIPTION OF THE DRAWING

The preferred embodiments of the invention are shown in the accompanying drawing in which.

DETAILED DESCRIPTION OF THE DRAWING

Figure 1:
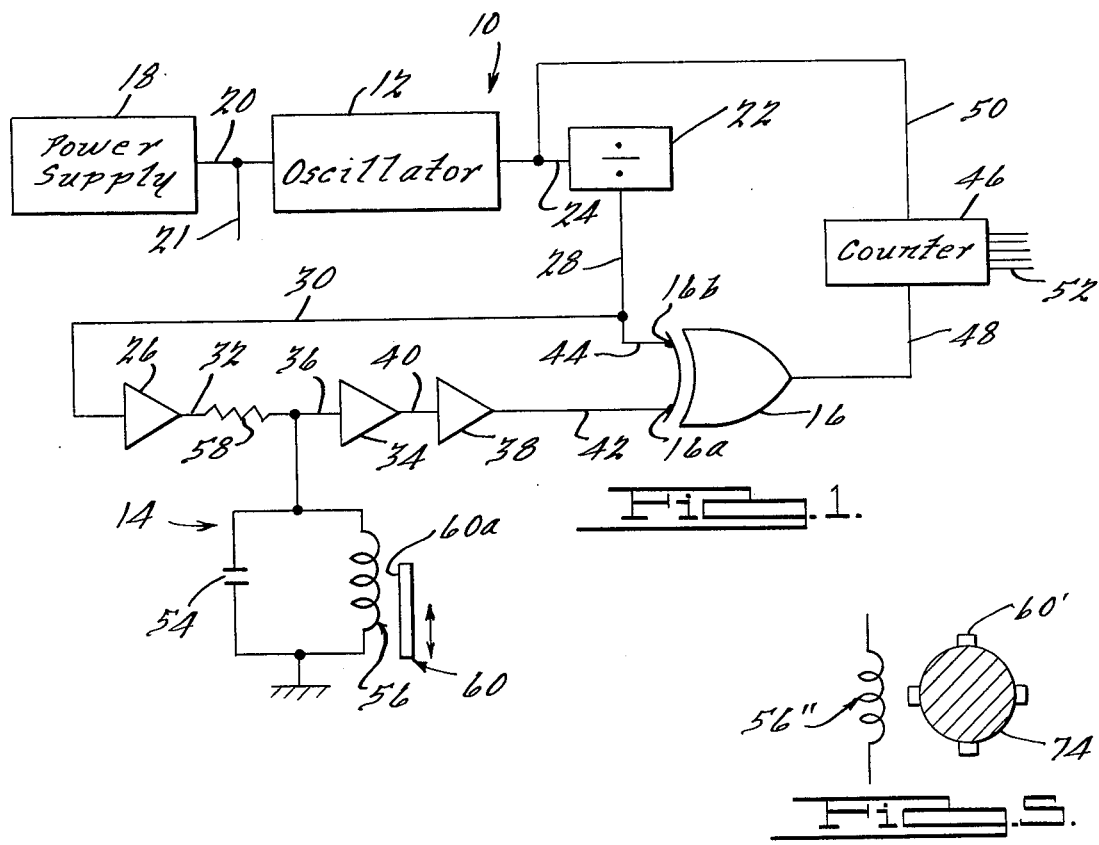
FIG. 1 is a generalized illustration of an electronic system for detecting a difference in phase between two cyclic signals.

Referring now to FIG. 1, therein is shown a generalized illustration of an electronic system or circuit 10 which detects a difference in phase between two cyclic signals and produces an output signal representative of the difference in phase between the signals. The first of the two cyclic signals is produced by an oscillator 12 and the second is produced by a resonant circuit 14 which is excited with current provided by the first signal. The voltage phase of the second signal is shifted relative to the phase of the first signal by changing the impedance of the resonant circuit. A detector or gate 16 produces a cyclic output signal having a duty cyclic representative of the difference in phase of the two signals. Circuit 10 may be used to detect the position or proximity of an object, the condition of an object, the presence of an object, or the speed of an object. Circuit 10 is of particular value as a throttle position indicator.

More specifically, circuit 10 includes a power supply 18 connected via a line 20 to oscillator 12 which produces a square wave signal, a line 21 for connecting the power supply to other components of circuit 10 in a well known manner, a frequency divider 22 connected to the oscillator via a line 24, a square wave buffer and driver 26 connected to the divider via lines 28 and 30 and operative to drive or excite the resonant circuit 14 via a line 32, an amplifier 34 connected to the resonant circuit via a line 36 and operative to amplify the second cyclic signal from the resonant circuit, a zero crossing detector and squarer 38 connected to the amplifier 34 via a line 40 and operative to square or reshape the second signal produced by the resonant circuit before it is applied to a terminal 16a of the detector 16 via a line 42, a line 44 connecting the divider output on line 28 directly to a reference terminal 16b of the detector, and a counter 46 connected to the output of detector 16 via a line 48 and to the output of oscillator 12 via a line 50.

The power supply 18, oscillator 12, divider 22, buffer and driver 36, amplifier 34, zero crossing detector and squarer 38, detector 18, and counter 46 are all known items or components that can be readily obtained and assembled by persons skilled in the electronic art. Oscillator 12 includes a quartz crystal which resonates at 3.2 MHZ. However, other types of resonantors and oscillators may be used. Divider 22 divides the 3.2 MHZ signal by a factor of 64. Buffer driver 26 may include an invertor and a power transistor. The zero crossing detector and squarer 38 may be a Schmitt Trigger. Detector 16 may be any of several well known gating devices. Herein, the gating device is an exclusive-or gate which produces a cyclic output signal having a duty cycle representative of the difference in phase between the two signals on input terminals 16a and 16b. The gate switches high to the duty cycle portion of the output signal whenever one of the inputs is low and the other is high; i.e., the output is high during the out of phase portion of the signals. The gate switches low whenever both inputs are the same, i.e., the output is low during the in phase portion of the signals.

Counter 46 may be any of several well known digital counters. Herein, the counter is enabled or starts to count the pulses supplied thereto by line 50 when the signal on line 48 switches high to the duty cycle portion of the output signal, is disabled or stopped from counting when the signal switches low, and produces a digital signal on lines 52 representative to the width of the duty cycle portion of the output signal. Counter 46 may of course be configured to start counting when the signal on line 48 switches low and stopped from counting when the signal switches high.

Resonant circuit 14 includes capacitive and inductive reactive elements 54 and 56 which are excited by the current signal in line 32 via a damping resistor 58. Resistor 58 allows the second signal or voltage signal resonating between the reactive elements to shift in phase relative to the reference voltage signal on lines 32 and 28 whenever the effective impedance of either or both of the reactive elements is changed. Herein, the reactive elements are connected in parallel; however, they may be connected in series.

Capacitive element 54 is a capacitor and inductive element 56 is an inductor coil. Looking now at FIG. 2, coil 56 may comprise about 50 wraps of 25 gauge copper wire (not shown) wound on a spool or bobbin 56a having an I.D. 56b of about 0.375 inches, an O.D. 56c of about 0.800 inches, and a thickness (not shown) of about 0.125 inches. Coil 56 produces, in a well known manner, an electromagnetic field composed of lines of induction extending substantially parallel to the axis of the bobbin.

Figure 2:
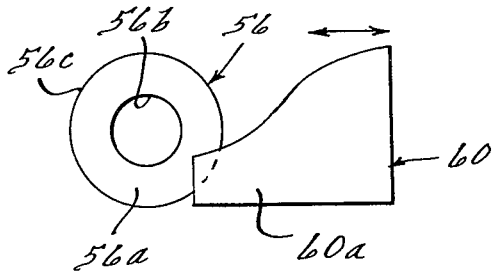
FIG. 2 is a view looking in the direction of line 2—2 of FIG. 1.

The effective impedance of coil 56, and hence the effective impedance of the resonant circuit, is changed by moving a coupling or metallic material 60 into and out of the electromagnetic field in such a manner that the surface 60a of the metallic material facing the coil cuts increasing or decreasing numbers of the lines of induction, thereby inducing a current into the coupling. The surface of the coupling may be shaped, as shown in FIG. 2, to provide virtually any desired phase shift in response to various positions of the coupling in the field; e.g., the surface may be shaped to provide linear phase shifts or a non linear phase shift relative to the positions of the coupling in the field. The angle of movement of the coupling and its surface relative to the lines of induction is not critical; however, movement in a plane substantially normal to the lines of induction seems to provide the best results. Further, the coupling may be ferrous or nonferrous, may be a plate (as in FIGS. 1 and 2), may be a shorted coil 62 (as in FIG. 3), may be a portion of an object such as a portion of a throttle linkage (not shown), or may be magnetic material.

Figure 3:
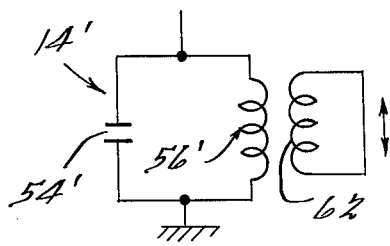
FIG. 3 is a modification of one portion of the system.

Looking briefly at FIG. 3, wherein numbers suffixed by a prime represent components identical to the same numbered components of FIG. 1, therein is shown a resonant circuit 14' having a capacitor 54', an inductor coil 56', and a coupling 62. Coupling 62 may be a coil such as coil 56 with the ends of the copper wire shorted together.

The phase of the resonant circuit signal, which is applied to terminal 16a of the detector may be initially set to lead, lag or be in phase with the reference signal on terminal 16b by selecting the proper values for the resonant circuit capacitor, inductor, and resistor. For example, these values may be selected such that the resonant circuit signal is in phase with the reference signal when the coupling 60, composed of a ferrous plate, is partly disposed in the electromagnetic field enough to cut only a few of the lines of induction. Hence, movement of the plate further into the field cuts increasing numbers of the lines of induction, causes the phase of the resonant circuit signal to lag the reference, causes the detector to switch from a steady low output to a cyclic output having a duty cycle portion which increases in width as the plate moves further into the field, and causes the digital output of the counter to increase.

Figure 4:
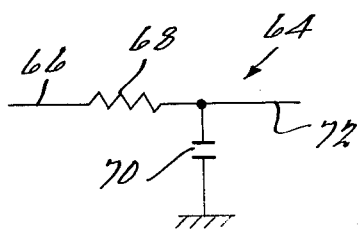
FIG. 4 is a modification of another portion of the system.

Looking now at FIG. 4, therein is shown a smoothing circuit 64 which may be used in lieu of counter 46 to change the output of circuit 10 from digital to analog. Circuit 64 includes a line 66 which connects to the output of detector 16 in lieu of line 48, a resistor 68, a capacitor 70 and an output line 72. When the system is used as a position indicator, the signal on line 72 will change in value as a function of the position of the coupling in the electromagnetic field. When the system is used as a speed detector, the signal on line 72 will pulse or momentarily change each time the coupling passes through the field. When this simple smoothing circuit is used in lieu of the digital counter, a lower frequency oscillator may be used to negate the need for divider 22, whereby the output of the oscillator may then be connected directly to driver 26 and terminal 16b of detector 16.

Figure 5:
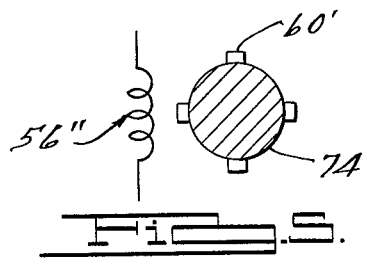
FIG. 5 is yet another modification of a portion of the system.

Looking now at FIG. 5, wherein numbers suffixed by a double prime represent components identical to the same numbered components of FIG. 1, therein is shown a shaft 74 adapted to rotate about its axis, teeth 76 projecting therefrom and a coil 56" fixed relative to the axis of the shaft. Teeth 76 pass through the electromagnetic field produced by coil 56" and produce phase shifts in the resonant circuit. The rate of the phase shifts represent the angular velocity of the shaft.

The preferred embodiments of the invention have been disclosed for illustration purposes. Many variations and modifications of the preferred embodiments are believed to be within the spirit of the invention. The following claims are intended to cover the inventive portions of the preferred embodiment and variations and modifications believed to be within the spirit of the invention.

What is claimed is:

1. An electronic system comprising:
   means for producing a first square wave cyclic signal;
   a resonant circuit including reactive means, said resonant circuit excited by said first cyclic signal and operative to produce a second cyclic signal shiftable in phase relative to said first cyclic signal in response to changes in effective impedance of said resonant circuit:
   coupling means movable relative to said reactive means and operative in response to such relative movement to change said effective impedance and shift the phase of said second cyclic signal relative to the phase of said first cyclic signal;
   wave shaping means operative to shape said second cyclic signal into a second cyclic square wave signal; and
   detector means operative to produce a cyclic output signal having an amplitude independent of the difference in phase between said first and second square wave cyclic signals and having a duty cycle representative of the difference in phase between said first and second square wave cyclic signals.

2. The system of claim 1, wherein said reactive means includes an inductor coil producing lines of induction defining an electromagnetic field and said coupling means includes a metallic material operative to cut increasing numbers of said lines as said metallic material is moved further into said field and effect a change in said effective impedance of said resonant circuit in proportion to the number of said lines cut.

3. The system of claim 2, wherein said metallic material is a shorted coil.

4. The system of claim 2, wherein said metallic material comprises a ferrous metal.

5. The system of claim 2, wherein said metallic material comprises a nonferrous metal.

6. The system of claim 1, further including:
   a digital counter responsive to said cyclic output signal and operative to produce a digital output representative of the difference in phase between said first and second cyclic signal.

7. The system of claim 1, wherein said resonant circuit includes a capacitor connected in parallel with said first reactive means, said first reactive means includes an inductor coil producing lines of induction, and said coupling means includes a metallic material operative to cut increasing numbers of said lines in response to said relative movement in one direction and effect said impedance change and phase shift of said second cyclic signal, whereby said output signal of said detector means changes in proportion to the number of said lines cut.

8. The system of claim 1, further including circuit means for smoothing said output signal to an average value of the cyclic period of said output signal.

9. The system of claim 8, further including:
means producing a third cyclic signal having a frequency substantially greater than the frequency of said output signal; and
a digital counter for counting pulses of said third cyclic signal during the duty cycle of said output signal and operative to produce a digital output representative of the difference in phase between said first and second cyclic signals.

10. An electronic position sensing system comprising:
means for producing a first square wave cyclic signal;
a resonant circuit including an inductor coil operative to produce lines of induction in response to excitation of said resonant circuit by said first cyclic signal, said resonant circuit operative to produce a second cyclic signal shiftable in phase relative to said first cyclic signal in response to changes in effective impedance of said resonant circuit;
a metallic material defining a surface movable relative to said coil and operative in response to said relative movement in one direction to cut increasing numbers of said lines to effect a change in said impedance and shift the phase of said second cyclic signal relative to the phase of said first cyclic signal;
wave shaping means operative to shape said second cyclic signal into a square wave signal; and
detector means operative to produce a cyclic output signal having an amplitude independent of the difference in phase between said first and second square wave cyclic signals and having a duty cycle representative of the difference in phase between said first and second square wave cyclic signals.

11. An electronic system comprising:
means for producing a first square wave cyclic signal;
a resonant circuit excited by said first cyclic signal and including an inductor element connected in parallel with a capacitor element, said resonant circuit operative to produce a second cyclic signal shiftable in phase relative to said first cyclic signal in response to changes in effective impedance of said resonant circuit;
coupling means movable relative to one of said elements and operative in response to such relative movement to change said effective impedance and shift the phase of said second cyclic signal relative to the phase of said first cyclic signal;
wave shaping means operative to shape said second cyclic signal into a square wave signal; and
detector means operative to produce a cyclic output signal having an amplitude independent of the difference in phase between said first and second square wave cyclic signals and have a duty cycle representative of the difference in phase between said first and second square wave cyclic signals.

12. The system of claim 11, further including:
circuit means for smoothing said cyclic output signal to an average value for the cyclic period of said output signal.

13. The system of claim 11, further including:
a digital counter responsive to said cyclic output signal and operative to produce a digital output representative of the difference in phase between said first and second cyclic signals.

14. The system of claim 11, further including:
means producing a third cyclic signal having a frequency substantially greater than the frequency of said output signal; and
a digital counter for counting pulses of said third cyclic signal during the duty cycle of said output signal and operative to produce a digital output representative of the difference in phase between said first and second cyclic signals.

15. An electronic system comprising:
means for producing a first square wave cyclic signal;
a resonant circuit excited by said first cyclic signal and including a capacitor connected in parallel with an inductor coil operative to produce lines of induction, said resonant circuit operative to produce a second cyclic signal shiftable in phase relative to said first cyclic signal in response to changes in effective impedance of said resonant circuit;
a metallic material defining a surface movable substantially normal to said lines and operative in response to such movement in one direction to cut increasing numbers of said lines to effect a change in said impedance and shift the phase of said second cyclic signal relative to the phase of said first cyclic signal;
wave shaping means operative to shape said second cyclic signal into a square wave signal; and
detector means operative to produce a cyclic output signal having an amplitude independent of the difference in phase between said first and second cyclic signals and having a duty cycle representative of the difference in phase between said first and second square wave cyclic signals.

16. An electronic system comprising:
means for producing a first square wave cyclic signal;
a resonant circuit including reactive means, said resonant circuit excited by said first cyclic signal and operative to produce a second cyclic signal shiftable in phase relative to said first cyclic signal in response to changes in effective impedance of said resonant circuit;
means for supporting said reactive means adjacent to a rotating object and stationary relative to said axis;
means mounted for rotation with said object and operative in response to such rotation to pass in close proximity of said reactive element and momentarily change the effective impedance of said resonant circuit and momentarily shift the phase of said second cyclic signal relative to said first cyclic signal;
wave shaping means operative to shape said second cyclic signal into a square wave signal; and
detector means operative to produce a cyclic output signal having an amplitude independent of the difference in phase between said first and second cyclic square wave signals and having a duty cycle which momentarily changes in value in response to said momentary phase shifts.

17. The system of claim 16, wherein the frequency of said momentary changes in value represent the angular velocity of said rotating object.

18. An electronic system comprising:
means for producing a first square wave cyclic signal;

a resonant circuit excited by said first cyclic signal and including inductor means operative to produce an electromagnetic field, said resonant circuit operative to produce a second cyclic signal shiftable in phase relative to said first cyclic signal in response to changes in effective impedance of said resonant circuit;

means for supporting said inductor means adjacent to an object rotating about an axis and stationary to said axis;

metallic means mounted for rotation with said object and operative in response to such rotation to pass through said field and momentarily change the effective impedance of said resonant circuit and momentarily shift the phase of said second cyclic signal relative to said first cyclic signal;

wave shaping means operative to shape said second cyclic signal into a square wave signal; and detector means operative to produce a cyclic output signal having an amplitude independent of the difference in phase between said first and second square wave cyclic signals and having a duty cycle which momentarily changes in value in response to said momentary phase shifts.

19. The system of claim 18, wherein said resonant circuit is a parallel resonant circuit.

20. The system of claim 18, wherein the frequency of said momentary changes in value represent the angular velocity of said rotating object.

21. A system for detecting the position of an object, said system comprising:

first means producing a first cyclic signal;

second means having reactive means and an effective impedance, said second means producing a second cyclic signal at the same frequency as said first cyclic signal and operative to shift the phase of said second cyclic signal relative to the phase of said first cyclic signal in response to changes in the effective impedance of said second means;

coupling means defining a surface which electrically couples with said reactive means, said surface movable from a first position having a minimum electric coupling to a second position having a maximum electric coupling to change said effective impedance and shift the phase of said second cyclic signal relative to the phase of said first cyclic signal, and said surface having a predetermined shape for controlling the amount of said electric coupling in response to both the shape of said surface and the position of said surface, whereby a predetermined linear or non-linear correlation between the movement of said surface and the phase shift may be obtained; and detector means operative to produce an output signal representative of the difference in phase between said first and second signals.

22. A system for detecting the position of an object, said system comprising:

means for producing a first cyclic signal;

a resonant circuit including reactive means, said resonant circuit excited by said first cyclic signal and operative to produce a second cyclic signal shiftable in phase relative to said first cyclic signal in response to changes in effective impedance of said resonant circuit;

coupling means defining a surface which electrically couples with said reactive means, said surface movable from a first position having a minimum electric coupling to a second position having a maximum electric coupling to change said effective impedance and shift the phase of said second cyclic signal relative to the phase of said first cyclic signal, and said surface having a predetermined shape for controlling the amount of said electric coupling in response to both the shape of said surface and the position of said surface, whereby a predetermined linear or non-linear correlation between the movement of said surface and the phase shift may be obtained; and detector means operative to produce an output signal representative of the difference in phase between said first and second signals.

23. The system of claim 22 wherein said reactive means comprises:

an inductor coil producing lines of induction defining an electromagnetic field and said coupling means inductively couples with said coil through said lines of induction.

24. The system of claim 23, wherein said coupling means comprises:

a metallic plate defining said surface, said surface is substantially triangular in shape, and said surface moves in a plane substantially normal to said lines of induction.

25. A system for detecting the position of an object, said system comprising:

means producing a first cyclic signal;

a resonant circuit excited by said first cyclic signal and including an inductor element connected in parallel with a capacitor element, said resonant circuit excited by said first cyclic signal and operative to produce a second cyclic signal shiftable in phase relative to said first cyclic signal in response to changes in effective impedance of said resonant circuit;

coupling means defining a surface which inductively couples with said reactive means, said surface movable from a first position having a minimum coupling to a second position having a maximum coupling to change said effective impedance and shift the phase of said second cyclic signal relative to the phase of said first cyclic signal, and said surface having a predetermined shape for controlling the amount of said electric coupling in response to both the shape of said surface and the position of said surface, whereby a predetermined linear or non-linear correlation between the movement of said surface and the phase shift may be obtained; and detector means operative to produce an output signal representative of the difference in phase between said first and second signals.

26. The system of claim 25, wherein said coupling means includes:

a metallic plate defining said surface, said surface is substantially triangular in shape, and said surface moves in a plane substantially normal to said lines of induction produced by said inductor.

27. A system for detecting the position of an object, said system comprising:

first means producing a first square wave cyclic signal;

second means having reactive means and an effective impedance, said second means producing a second cyclic signal at the same frequency as said first cyclic signal and operative to shift the phase of said second cyclic signal relative to the phase of said first cyclic signal in response to changes in the effective impedance of said second means;

coupling means defining a surface which electrically couples with said reactive means, said surface movable from a first position having a minimum electric coupling to a second position having a maximum electric coupling to change said effective impedance and shift the phase of said second cyclic signal relative to the phase of said first cyclic signal, and said surface having a predetermined shape for controlling the amount of said electric coupling in response to both the shape of said surface and the position of said surface, whereby a predetermined linear or non-linear correlation between the movement of said surface and the phase shift may be obtained;

wave shaping means operative to shape said second signal into a second square wave cyclic signal; and detector means operative to produce a cyclic output signal having an amplitude independent of the phase difference between said first and second square wave cyclic signals and having a duty cycle representative of the difference in phase between said first and second square wave cyclic signals.

28. A system for detecting the position of an object, said system comprising:

means for producing a first square wave cyclic signal;

a resonant circuit including reactive means, said resonant circuit excited by said first cyclic signal and operative to produce a second cyclic signal shiftable in phase relative to said first cyclic signal in response to changes in effective impedance of said resonant circuit;

coupling means defining a surface which electrically couples with said reactive means, said surface movable from a first position having a minimum electric coupling to a second position having a maximum electric coupling to change said effective impedance and shift the phase of said second cyclic signal relative to the phase of said first cyclic signal, and said surface having a predetermined shape for controlling the amount of said electric coupling in response to both the shape of said surface and the position of said surface, whereby a predetermined linear or non-linear correlation between the movement of said surface and the phase shift may be obtained;

wave shaping means operative to shape said second cyclic signal into a second square wave cyclic signal; and detector means operative to produce a cyclic output signal having an amplitude independent of the difference in phase between said first and second square wave cyclic signals and having a duty cycle representative of the difference in phase between said first and second signals.

29. The system of claim 28, wherein said reactive means comprises:

an inductor coil producing lines of induction defining an electromagnetic field and said coupling means inductively couples with said coil through said lines of induction.

30. The system of claim 29, wherein said coupling means comprises:

a metallic plate defining said surface, said surface is substantially triangular in shape, and said surface moves in a plane substantially normal to said lines of induction.

31. A system for detecting the position of an object, said system comprising:

means producing a first square wave cyclic signal;

a resonant circuit excited by said first cyclic signal and including an inductor element connected in parallel with a capacitor element, said resonant circuit excited by said first cyclic signal and operative to produce a second cyclic signal shiftable in phase relative to said first cyclic signal in response to changes in effective impedance of said resonant circuit;

coupling means defining a surface which inductively couples with said reactive means, said surface movable from a first position having a minimum coupling to a second position having a maximum coupling to change said effective impedance and shift the phase of said second cyclic signal relative to the phase of said first cyclic signal, and said surface having a predetermined shape for controlling the amount of said electric coupling in response to both the shape of said surface and the position of said surface whereby a predetermined linear or non-linear correlation between the movement of said surface and the phase shift may be obtained;

wave shaping means operative to shape said second cyclic signal into a second square wave cyclic signal; and detector means operative to produce a cyclic output signal having an amplitude independent of the difference in phase between said first and second square wave signals and having a duty cycle representative of the difference in phase between said first and second square wave signals.

32. The system of claim 31, wherein said coupling means includes:

a metallic plate defining said surface, said surface is substantially triangular in shape, and said surface moves in a plane substantially normal to said lines of induction produced by said inductor.

* * * * *